(12) United States Patent
Sun et al.

(10) Patent No.: US 11,716,755 B2
(45) Date of Patent: Aug. 1, 2023

(54) MULTIPLE OPPORTUNITY ACK TO PRE-GRANT DESIGN FOR RECEIVER SIDE ECCA FOR MMWAVE BAND OPERATION

(71) Applicant: QUALCOMM Incorporated, San Diego, CA (US)

(72) Inventors: Jing Sun, San Diego, CA (US); Xiaoxia Zhang, San Diego, CA (US); Vinay Chande, San Diego, CA (US); Arumugam Chendamarai Kannan, San Diego, CA (US); Srinivas Yerramalli, Hyderabad (IN); Tao Luo, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/125,021

(22) Filed: Dec. 17, 2020

(65) Prior Publication Data

US 2021/0250998 A1   Aug. 12, 2021

Related U.S. Application Data

(60) Provisional application No. 62/971,415, filed on Feb. 7, 2020.

(51) Int. Cl.
| | |
|---|---|
| *H04W 74/08* | (2009.01) |
| *H04L 5/00* | (2006.01) |
| *H04W 72/21* | (2023.01) |
| *H04W 72/0453* | (2023.01) |

(52) U.S. Cl.
CPC ....... *H04W 74/0808* (2013.01); *H04L 5/0055* (2013.01); *H04W 72/21* (2023.01); *H04W 72/0453* (2013.01)

(58) Field of Classification Search
CPC ......... H04W 74/0808; H04W 74/0816; H04W 74/0825; H04W 74/085; H04W 74/0858; H04L 5/0055; H04L 5/0057
See application file for complete search history.

(56) References Cited

U.S. PATENT DOCUMENTS

| | | | |
|---|---|---|---|
| 2016/0242169 A1* | 8/2016 | Park | H04L 1/1861 |
| 2017/0013479 A1* | 1/2017 | Sun | H04L 27/2601 |
| 2019/0357255 A1* | 11/2019 | Sun | H04L 5/0094 |
| 2021/0344453 A1* | 11/2021 | Lei | H04W 72/0446 |

\* cited by examiner

*Primary Examiner* — Bo Hui A Zhu
(74) *Attorney, Agent, or Firm* — Arent Fox, LLP

(57) ABSTRACT

Aspects are provided that allow a base station to provide a user equipment (UE) multiple timing opportunities to transmit an acknowledgment to a pre-grant (APG) after receiving a pre-grant for a downlink transmission. The base station transmits to the UE a pre-grant for a downlink transmission from the base station, the pre-grant triggering a plurality of timing opportunities for the UE to send an APG to the base station. The UE performs, after receiving the pre-grant, a clear channel assessment (CCA) during at least one timing opportunity of the plurality of timing opportunities. The UE transmits one or more APGs to the base station when the CCA is successful, and the UE receives the downlink transmission from the base station in response to the one or more APGs. The UE transmits the one or more APGs to the base station until the downlink transmission is received from the base station.

30 Claims, 13 Drawing Sheets

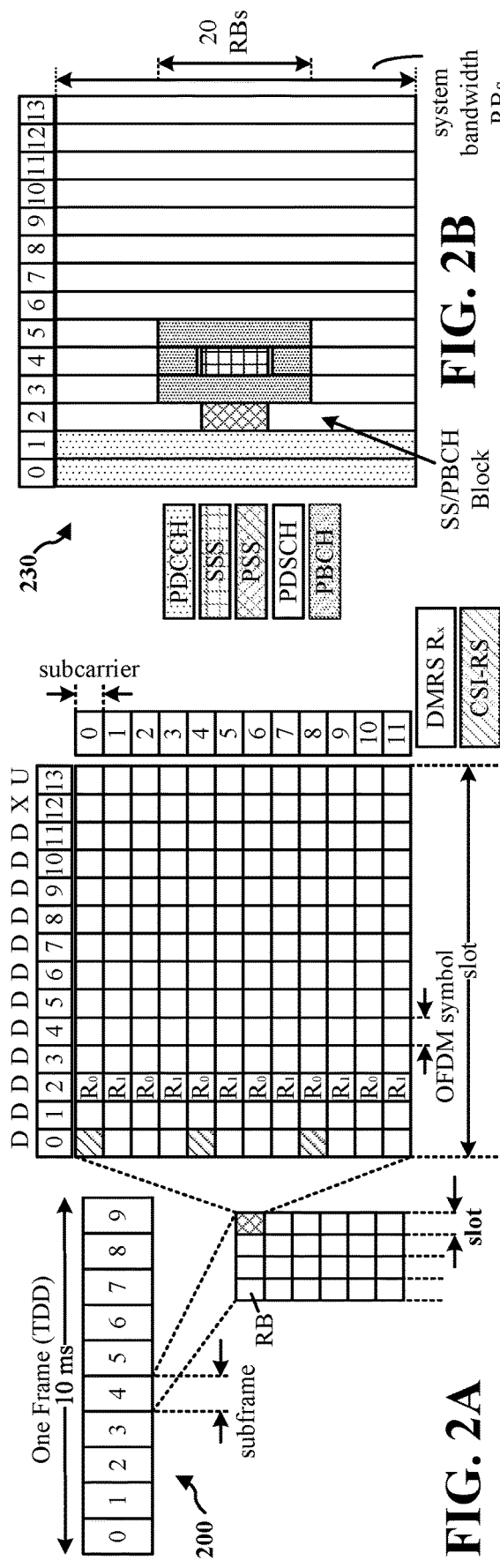
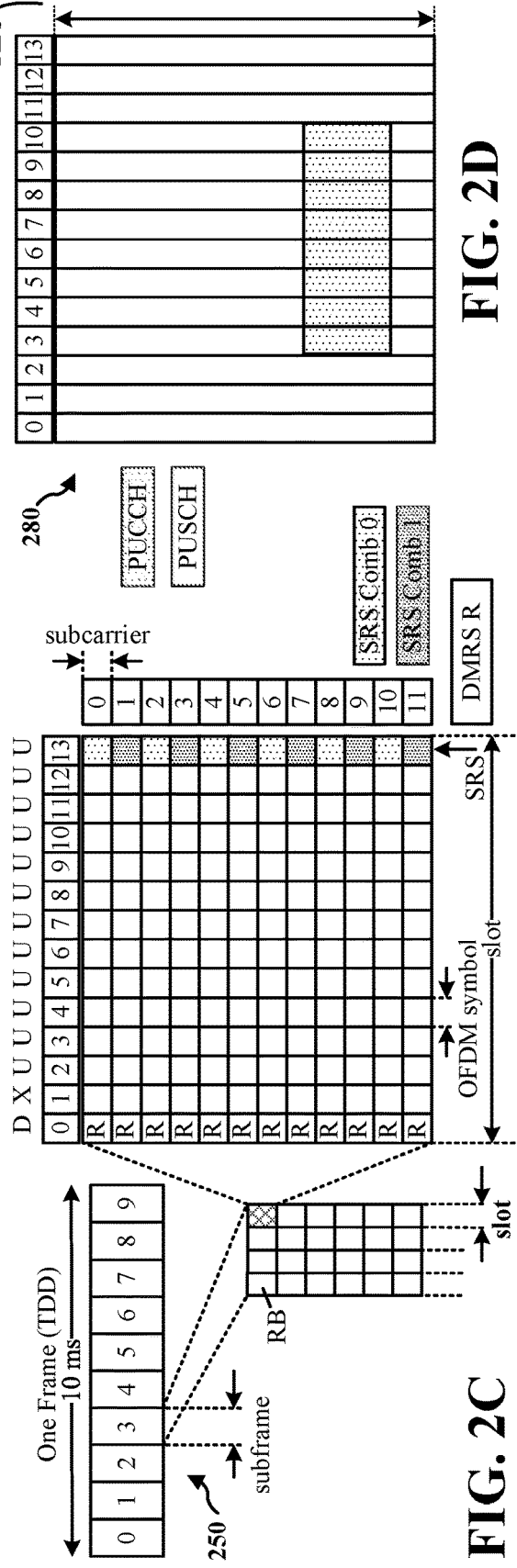

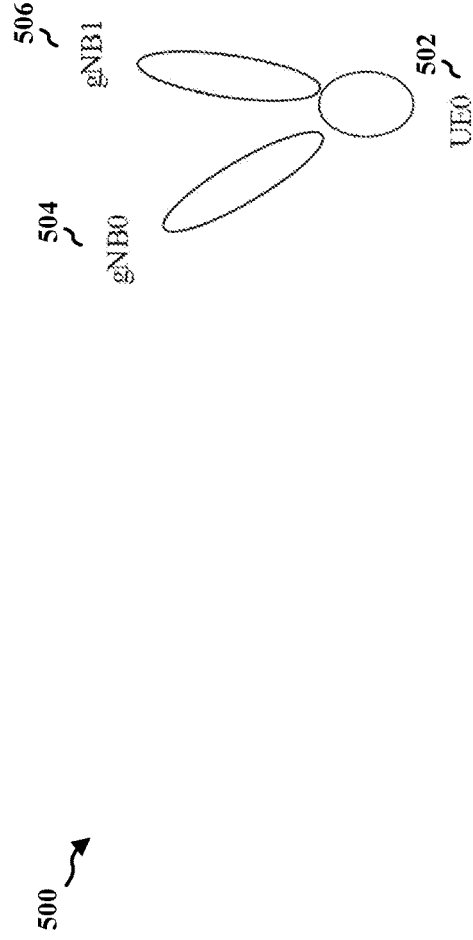
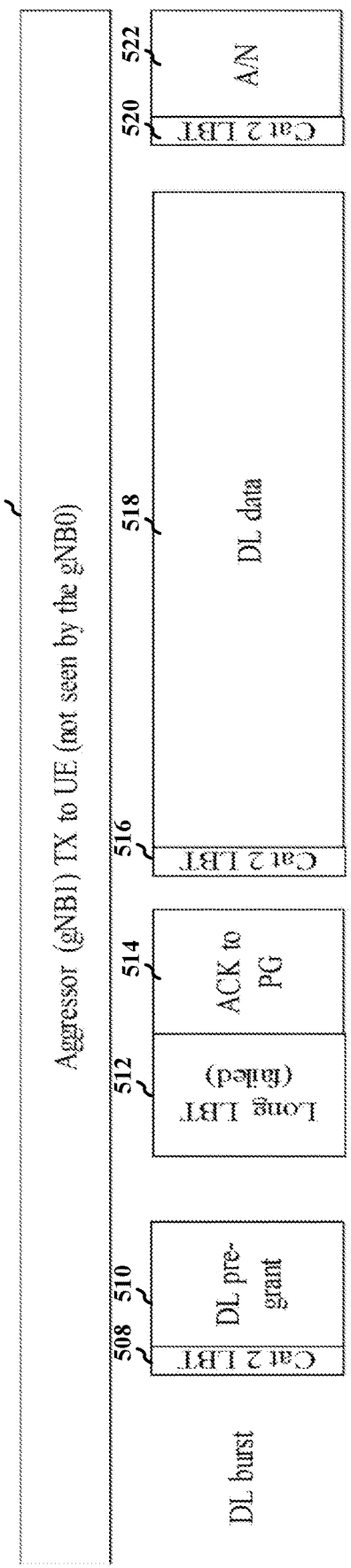
FIG. 5

MULTIPLE OPPORTUNITY ACK TO PRE-GRANT DESIGN FOR RECEIVER SIDE ECCA FOR MMWAVE BAND OPERATION

CROSS REFERENCE TO RELATED APPLICATION(S)

This application claims the benefit of U.S. Provisional Application Ser. No. 62/971,415, entitled "MULTIPLE OPPORTUNITY ACK TO PRE-GRANT DESIGN FOR RECEIVER SIDE ECCA FOR MMWAVE BAND OPERATION" and filed on Feb. 7, 2020, of which is expressly incorporated by reference herein in its entirety.

BACKGROUND

Technical Field

The present disclosure relates generally to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a pre-grant for a downlink transmission from a base station, the pre-grant triggering a plurality of timing opportunities for sending an acknowledgment of the pre-grant (APG). The UE performs, after receiving the pre-grant, a clear channel assessment (CCA) during at least one timing opportunity of the plurality of timing opportunities. The UE transmits one or more APGs to the base station when the CCA is successful. The UE receives the downlink transmission from the base station in response to the one or more APGs, where the one or more APGs are transmitted to the base station until the downlink transmission is received.

In another aspect of the disclosure, a method, a computer-readable medium, and an apparatus are provided. The apparatus may be a base station. The base station transmits a pre-grant for a downlink transmission to a user equipment (UE), the pre-grant triggering a plurality of timing opportunities for receiving an APG. The base station receives one or more APGs from the UE when a CCA of the UE is successful during at least one timing opportunity of the plurality of timing opportunities. The base station sends the downlink transmission to the UE in response to the one or more APGs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a diagram illustrating another example of a UE receiving a downlink transmission from a base station.

DETAILED DESCRIPTION

Figure 1:
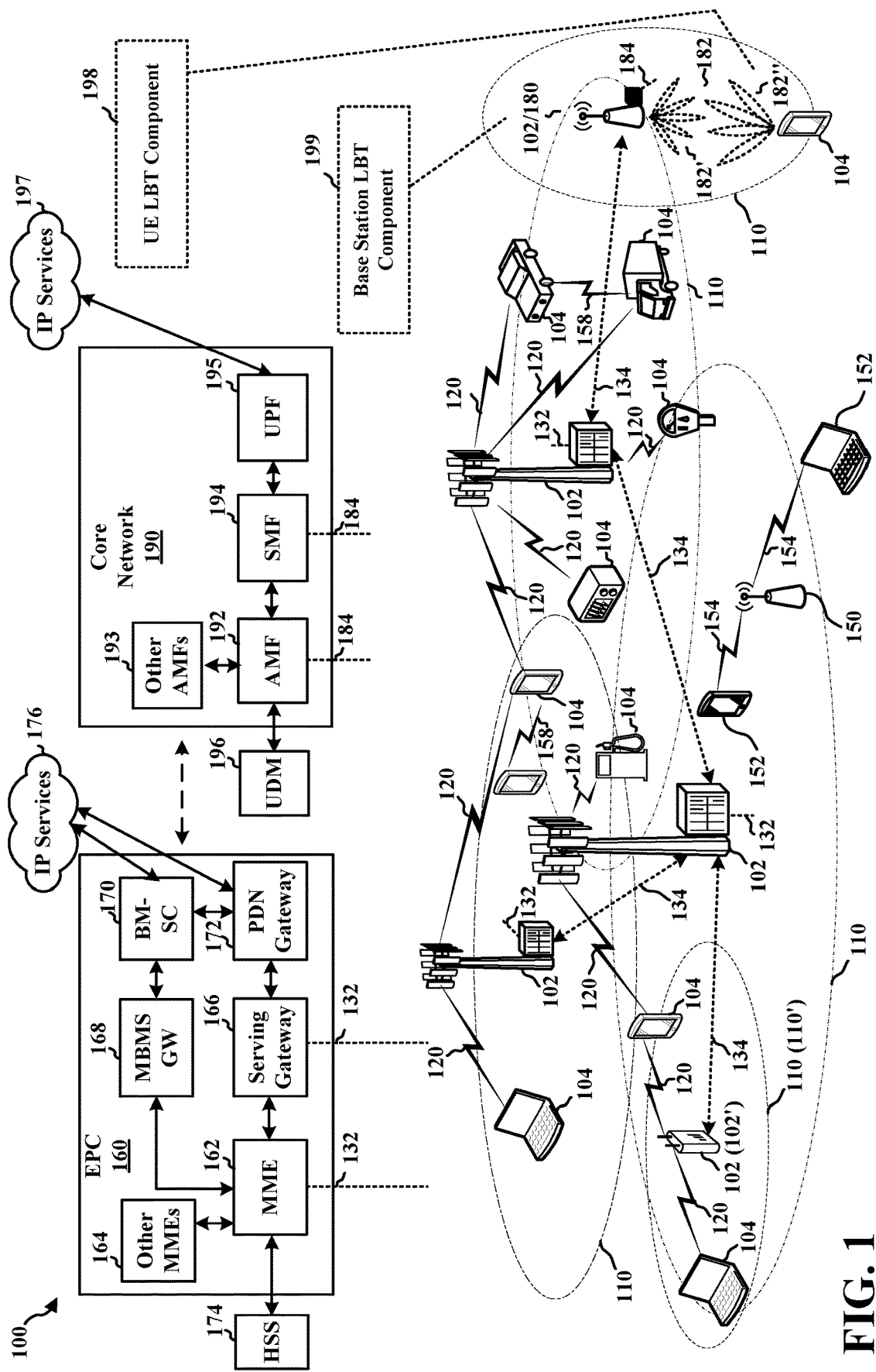
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE LBT component 198 configured to receive a pre-grant for a downlink transmission from a base station, where the pre-grant triggers a plurality of timing opportunities for sending an acknowledgment of the pre-grant (APG); to perform, after receiving the pre-grant, a clear channel assessment (CCA) during at least one timing opportunity of the plurality of timing opportunities; to transmit one or more APGs to the base station when the CCA is successful; and to receive the downlink transmission from the base station in response to the one or more APGs, where the one or more APGs are transmitted to the base station until the downlink transmission is received.

Still referring to FIG. 1, in other aspects, the base station 102/180 may include a base station LBT component 199 configured to transmit a pre-grant for a downlink transmission to a user equipment (UE), the pre-grant triggering a plurality of timing opportunities for receiving an acknowledgment of the pre-grant (APG); to receive one or more APGs from the UE when a clear channel assessment (CCA) of the UE is successful during at least one timing opportunity of the plurality of timing opportunities; and to send the downlink transmission to the UE in response to the one or more APGs.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
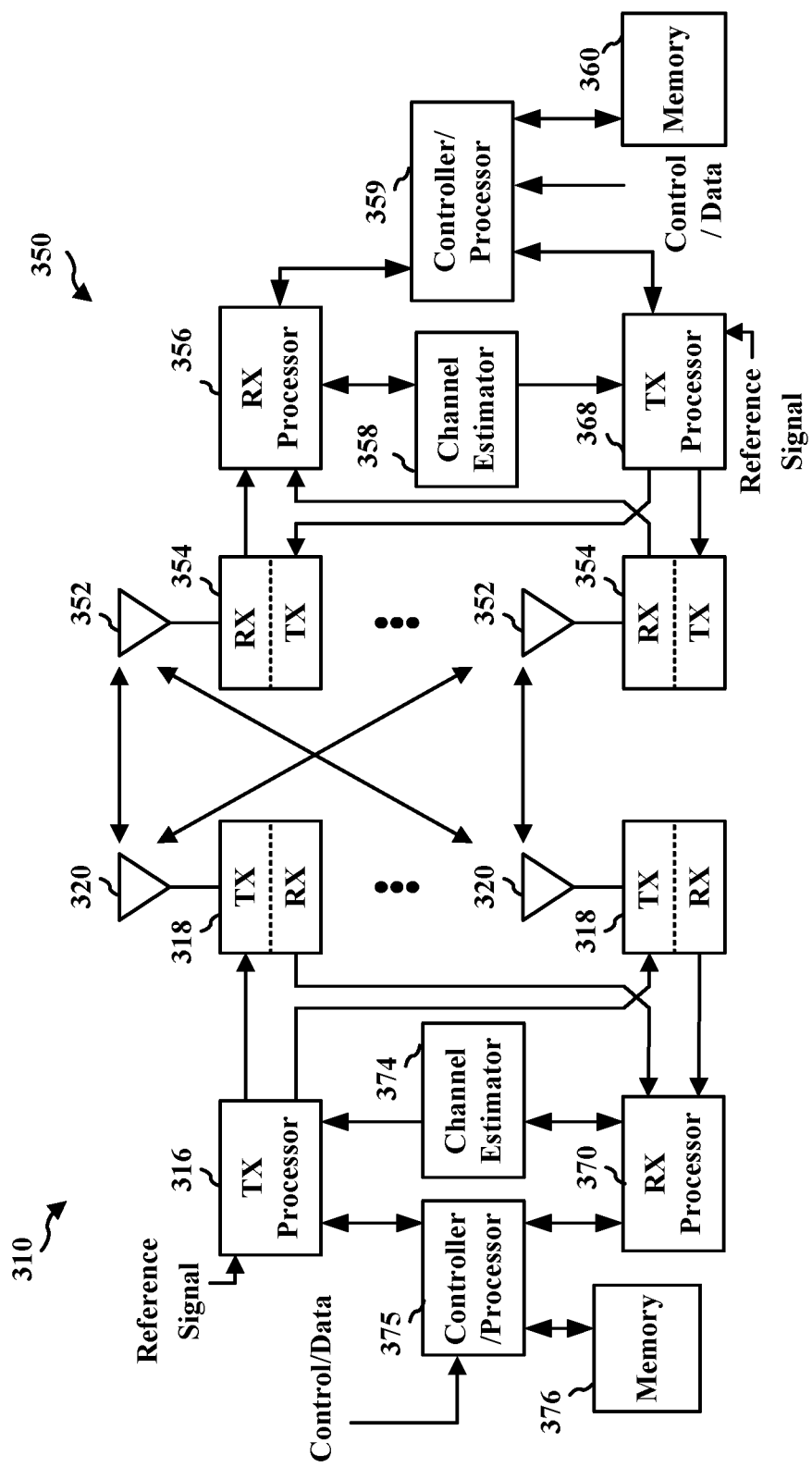
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE LBT component 198 of FIG. 1.

At least one of the TX processor 316, the RX processor 370, and the controller/processor 375 may be configured to perform aspects in connection with base station LBT component 199 of FIG. 1.

In millimeter wave (mmW) links, transmitters and receivers observe different interference patterns due to the highly directional nature of transmissions. As a result, a listen-before-talk (LBT) procedure is generally used to protect the reception of data from interference by other nodes. In LBT, a receiver (e.g. a UE or base station) applies a clear channel assessment (CCA) check before using a channel. The CCA utilizes at least energy detection to determine the presence or absence of other signals on a channel in order to determine if a channel is occupied or clear, respectively. After gaining channel access via a successful LBT operation, the receiver reserves the channel so that other nodes sense the channel to be occupied and therefore refrain from transmitting on the channel. As a result, the data received by the UE or base station may be protected from interference upon gaining access to the channel. Moreover, unnecessary backoff during LBT may be avoided and the receiver may be protected.

Channel access schemes may be classified into several categories, without LBT (Category 1) and with LBT (Categories 2-4). In Category 2 LBT, the UE or base station applies LBT without a random back-off. That is, the duration of time that the channel is sensed to be idle before transmitting on the channel is deterministic (not random). In Category 3 LBT and Category 4 LBT, the UE or base station applies LBT with a random back-off with a contention window of fixed size or variable size, respectively. In this procedure, the UE or base station draws a random number N within a contention window. The size of the contention window is specified by the minimum and maximum value of N. The size of the contention window is fixed in Category 3 LBT, and the size of the contention window can be varied when drawing the random number in Category 4 LBT. The random number N is used in the LBT procedure to determine the duration of time that the channel is sensed to be idle before transmitting on the channel.

In Category 2 LBT, the UE or base station applies CCA to detect whether the channel is idle over a fixed period of time. If the channel is sensed busy, the UE or base station refrains from accessing the channel. Otherwise, the UE or base station proceeds to access the channel for a channel occupancy time (COT). In contrast, in Category 3 and 4 LBT, if the initial CCA is unsuccessful, the UE or base station further applies an extended CCA (eCCA) to detect whether the channel is idle over a random period of time corresponding to the drawn random number within the contention window. The UE or base station waits a defer period (e.g. equal to the period of time for the initial CCA), and then senses whether the channel is busy during the random period of time. If the channel is sensed busy, the UE or base station refrains from accessing the channel and may repeat the eCCA process. Otherwise, the UE or base station proceeds to access the channel for the COT.

Generally, when the UE is receiving downlink data, the base station performs Category 2 LBT and, if successful, transmits a downlink grant scheduling a downlink transmission to the UE. However, although the base station may sense a clear channel due to lack of interference of the base station, the UE may still experience interference and thus may not successfully receive the downlink grant or transmission from the base station. Therefore, to allow the UE to confirm the receiver side channel is clear for reception, the base station may send a pre-grant (PG) to the UE, which is a control signaling message that triggers the UE to perform Category 4 LBT (including eCCA). When the UE receives the PG, the UE performs eCCA and if low or no interference is detected as a result, the UE sends an acknowledgment to the pre-grant (APG) to the base station. The base station may determine from the APG that the UE is in a safe position to receive data, and the base station may subsequently send the downlink grant and downlink transmission in a downlink burst accordingly to the UE. Otherwise, if a high amount of interference is detected, the UE refrains from sending APG (thus declining to receive the scheduling) and the base station determines not to send the downlink burst.

Figure 4:
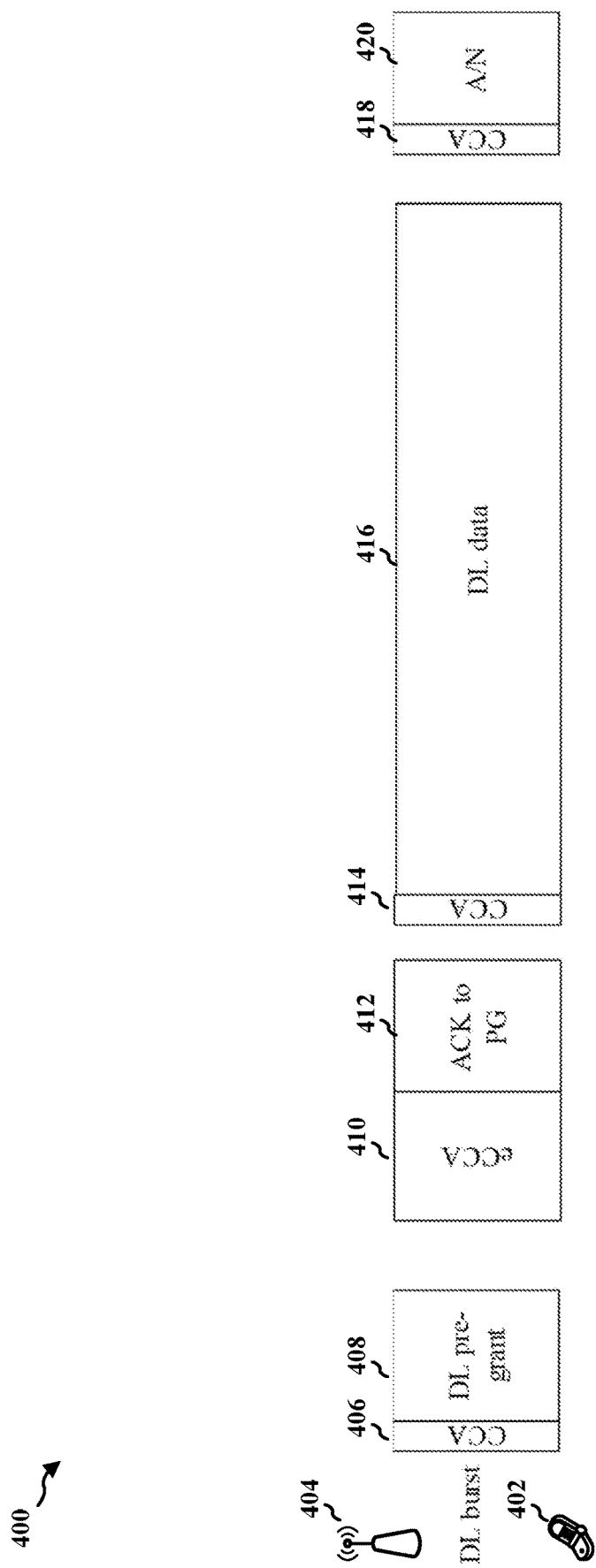
FIG. 4 is a diagram illustrating an example of a UE receiving a downlink transmission from a base station.

FIG. 4 illustrates an example diagram 400 of a UE 402 receiving a downlink burst from a base station 404 after sending an APG in response to a PG. The base station performs a CCA 406 (e.g. Category 2 LBT) to determine if the channel is clear for transmission. If the CCA 406 is successful, the base station sends a PG 408 to the UE. After receiving the PG, the UE then performs an eCCA 410 (e.g. Category 4 LBT) to determine if the channel is clear for transmission. If the eCCA 410 is successful, the UE transmits an APG 412 to the base station. When the base station receives the APG, the base station again performs a CCA 414 (e.g. Category 2 LBT) to determine if the channel is clear for transmission, and if the CCA 414 is successful, the base station sends a downlink burst 416 (including a downlink grant and a downlink transmission) to the UE. After receiving the downlink transmission, the UE performs a CCA 418 (e.g. Category 2 LBT) to determine if the channel is clear for transmission, and if the CCA 418 is successful, the UE sends an acknowledgment (ACK)/non-acknowledgment (NACK) feedback 420 to the base station depending on whether the downlink transmission is successfully received.

However, in certain situations, the base station may not receive an APG from the UE. For example, although the UE receives the PG, the UE may fail the Category 4 LBT CCA for APG transmission due to the presence of an interfering transmission (e.g. caused by a jammer). That is, when contending with the jammer for the channel, the UE may fail the CCA and therefore not transmit the APG to the base station. In such case, if the base station does not receive the APG from the UE, the base station will consider the failure to receive the APG an indication that the UE detected a jammer and therefore cannot receive the pre-granted downlink burst. In another example, the UE may not receive the PG, e.g., due to an ongoing transmission from a jammer which interfered with the UE's reception of the PG, or due to link budget constraints, beam management limitations, or control channel rate control restrictions.

For example, FIG. 5 illustrates an example diagram 500 of a UE 502 served by a base station 504 and an aggressor base station 506 serving another UE (not shown). Similar to the example described above with respect to FIG. 4, generally the base station 504 may perform CCA 508 (e.g. Category 2 LBT) and send a PG 510 to the UE if the CCA is successful, and the UE may perform eCCA 512 (e.g. Category 4 LBT) and send an APG 514 to the base station if the CCA is successful. If the base station receives the APG, the base station may perform CCA 516 (e.g. Category 2 LBT) and send a DL data burst 518 to the UE if the CCA is successful, and the UE may perform CCA 520 (e.g. Category 2 LBT) and send an ACK/NACK feedback 522 to the base station if the CCA is successful. However, in the case where the aggressor base station 506 simultaneously sends its own transmission 524 to the other UE which interferes with the transmissions of the UE 502, the base station 504 may fail to receive the APG 514 from the UE. While the base station 504 may not be able to distinguish whether failure to receive the APG from the UE was due to failure by the UE to receive the PG or due to failure by the UE to perform the eCCA, the base station 504 may omit sending the downlink burst due to the lack of receiving APG in either event.

In the examples described above of receiver-based LBT, where the receiver (e.g. the UE 502) of the PG fails to transmit the APG due to a failed eCCA, the transmitter (e.g. the base station 504) may continue to ping the receiver by re-sending the PG until an APG is eventually received. Such approach leads to inefficient resource usage and downlink overhead. Moreover, since the UE does not transmit the APG as a result of the eCCA failure, the aggressor base station 506 may not be notified of its interference to the UE, and as a result, the aggressor base station may continue sending interfering transmissions 524 without backing off for the UE. It would therefore be desirable to allow the base station to receive the APG without being required to constantly ping the UE, and to allow the UE to transmit the APG so aggressor base stations may be notified of interfering transmissions.

To address these concerns, the present disclosure allows the base station (e.g. the transmitter) to provide the UE (e.g. the receiver) multiple timing opportunities to transmit the APG after receiving a PG. When the UE succeeds in performing eCCA due to an absence of an interfering transmission by the aggressor base station, the UE may transmit the APG to the base station in one of the timing opportunities. Otherwise, if the UE fails in eCCA and therefore cannot transmit APG due to the interfering transmission, the UE may wait until another of the timing opportunities before performing eCCA again. Once the interfering transmission is complete and the UE succeeds in eCCA, the UE transmits one or more APGs to the base station. When the base station receives the APG and thus ascertains that the UE is ready to receive the downlink transmission, the base station may send the downlink transmission to the UE. Thus, the PG triggers the UE to send one or more APGs (e.g. a dial-back message or a call-back message) at multiple timing opportunities associated with the PG when the aggressor's interfering transmission becomes absent. As a result, the present disclosure provides for more efficient channel access due to less pinging of the UE by the base station, as well as accurate timing of APGs to coincide with the time when the channel becomes clear of interfering transmissions. Additionally, the present disclosure allows the UE to notify the aggressor base station of its presence by transmitting the APG, thereby allowing the aggressor base station to back off when contending for channel access with the UE.

Figure 6:
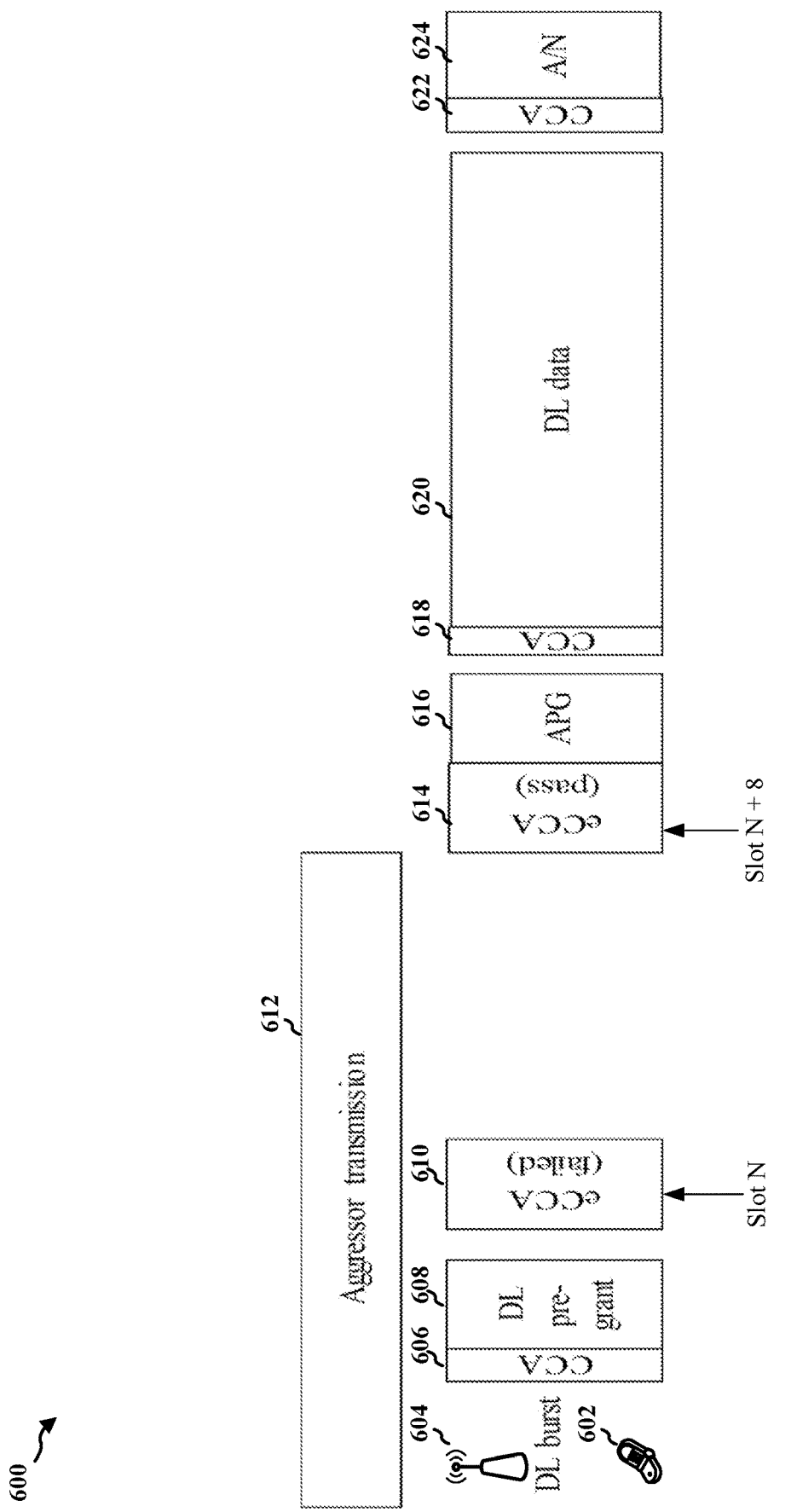
FIG. 6 is a diagram illustrating an example of a UE performing multiple clear channel assessments prior to receiving a downlink transmission from a base station.

FIG. 6 illustrates an example diagram 600 illustrating multiple time domain opportunities for APG transmission by a UE 602 to a base station 604. The base station may configure multiple timing opportunities for the UE to transmit APG in response to a PG that the UE receives from the base station. The base station may configure the multiple timing opportunities as a sequence of timing offsets, and the UE and base station may derive the absolute timing of these opportunities by applying the sequence of timing offsets to a first indicated APG location in the PG (e.g. slot N). For example, if the base station configures a sequence of timing offsets [0, 8, 16], and the first APG is triggered in slot N, the UE may perform eCCA for transmitting APGs in slots N, N+8, and N+16. Alternatively, the base station may configure the sequence of timing offsets to exclude the first indicated APG location (e.g. slot N), such that the sequence of timing offsets includes additional APG opportunities. Thus, in the example above, the sequence of timing offsets [0, 8, 16] may alternatively be configured as [8, 16], where the UE may again perform eCCA for transmitting APGs in slots N, N+8, and N+16. Other example sequences of timing offsets are possible.

In another example, the sequence of timing offsets may be selected from multiple timing offset patterns that are preconfigured by the network (e.g. core network 190) or configured by the base station. The base station may indicate which timing offset pattern for the UE to apply in the PG (e.g. using one or more bits). For example, if two timing offset patterns [0, 8, 16] and [0, 16, 32] are configured, the base station may select the first timing offset pattern [0, 8, 16] as the sequence of timing offsets to be applied by indicating bit '0' in the PG, and the base station may select the second timing offset pattern [0, 16, 32] as the sequence of timing offsets to be applied by indicating bit '1' in the PG, or vice-versa. Other example timing offset patterns or indications in PG are possible.

In a further example, a subset of a timing offset pattern that is preconfigured by the network (e.g. core network 190) or configured by the base station may be selected as the sequence of timing offsets for APG transmission. The sequence of timing offsets may be selected based on a bitmap corresponding to the timing offset pattern which is indicated in the PG. The bitmap may alternatively correspond to the additional timing opportunities of the timing offset pattern (e.g. excluding slot N). For example, if the timing offset pattern [0, 8, 16, 24, 32] is configured, in which

[8, 16, 24, 32] are the additional timing opportunities, the base station may selectively configure the bitmap corresponding to the additional timing opportunities to be 1010 (or vice-versa), which may indicate the UE to perform eCCA for transmitting APGs in slots N, N+8, and N+24. Other example timing offset patterns, bitmap arrangements, or indications in PG are possible.

Thus, in the example of FIG. 6, the base station 604 performs CCA to 606 determine if the channel is clear, and if CCA is successful, the base station sends a DL pre-grant 608 to the UE. The PG 608 may indicate [0, 8, 16] as the sequence of timing offsets, for example. The UE 602 then performs eCCA 610 based on the sequence of timing offsets to determine if the channel is clear for transmitting APG, starting at slot N. In this example, since an interfering transmission 612 of an aggressor base station is occurring during this time, the eCCA 610 may fail. Therefore, the UE waits until the next slot in the configured sequence, e.g. slot N+8, and performs eCCA 614 again. In this example, since the interfering transmission 612 is absent, the eCCA 614 will succeed, and the UE will subsequently transmit APG 616 to the base station. Once the base station receives the APG, the base station will perform CCA 618 to determine if the channel is clear, and if CCA is successful, the base station sends the DL data burst 620 to the UE. The UE may then perform CCA 622 to determine if the channel is clear to send ACK/NACK feedback 624.

The UE may transmit the APGs over one or more base station configured, but UE selected, resources. For example, if the base station configures the UE to transmit APG at slots N, N+8, and N+16 in the example of FIG. 6 above, the UE may select one or more subcarriers in those slots to send the APG when eCCA is successful. The base station may then perform blind decoding for the APG in those resources. For example, the base station may blindly decode the resources in slots N, N+8, and N+16 for the APG transmission when the sequence of offsets is configured to be [0, 8, 16], even if the UE only succeeds in eCCA during slot N+16. As a result, when the base station configures the multiple timing opportunities to be densely configured (e.g. the sequence [0, 8, 16] is more dense than the sequence [0, 16, 32]), higher blind decoding load to the base station may result due to the base station having to decode the configured slots more frequently for APG transmissions. However, denser resource configurations may allow the UE to more quickly respond with APG in the absence of an interfering transmission than in more sparse resource configurations.

In the example described above, the UE transmits one APG during each timing opportunity in which the UE performs a successful eCCA due to absence of an interfering transmission. However, the base station may also configure the UE to transmit multiple APGs (e.g. retransmissions of the initial APG) during each timing opportunity. For example, even if the UE detects that the channel is clear and sends an APG to the base station in a configured slot, the base station may not receive the APG if it is serving other UEs during that slot. Therefore, the base station may configure the UE to retransmit the APG until the base station successfully receives the message and subsequently sends a downlink transmission to the UE. In such case, to prevent the repeated APGs from causing additional interference to other UEs, the base station may configure a limit in the maximum number of APGs (e.g. retransmissions) that the UE may be allowed to transmit in response to one PG.

Moreover, the APG may be transmitted to the base station as a waveform in PUCCH. Thus, when the base station sends PG to the UE, the base station may indicate a PUCCH resource indicator (PRI) in the PG. The UE may then determine based on the PRI the resources in PUCCH for transmitting the APG(s) during each timing opportunity. The base station may configure the same PRI for the APGs (e.g. initial transmission and any retransmissions) in all configured timing opportunities (e.g. slots N, N+8, N+16, etc.).

Additionally, when the UE transmits APG to the base station, the APG may indicate to an aggressor base station to backoff from subsequently accessing the channel again. For example, if the aggressor base station is a Wi-Fi/11ad/11ay node, then after completing an interfering transmission, that node may perform LBT for a random amount of time in a contention window of up to 16 slots before re-accessing the channel. Therefore, if the UE sends the APG during this contention window of the Wi-Fi node, the node may be prompted to backoff due to detection of energy on the channel from the UE's message. As a result, a level of cross-radio access technology (RAT) fairness can be achieved. This fairness is especially apparent when the eCCA contention window size of the UE is approximately or equal to the contention window size of the Wi-Fi node and the timing opportunities for APG transmission are more densely configured, since there is an equal likelihood that either the UE or the aggressor base station will win access to the medium depending on the selected random number in the contention windows.

Figure 7:
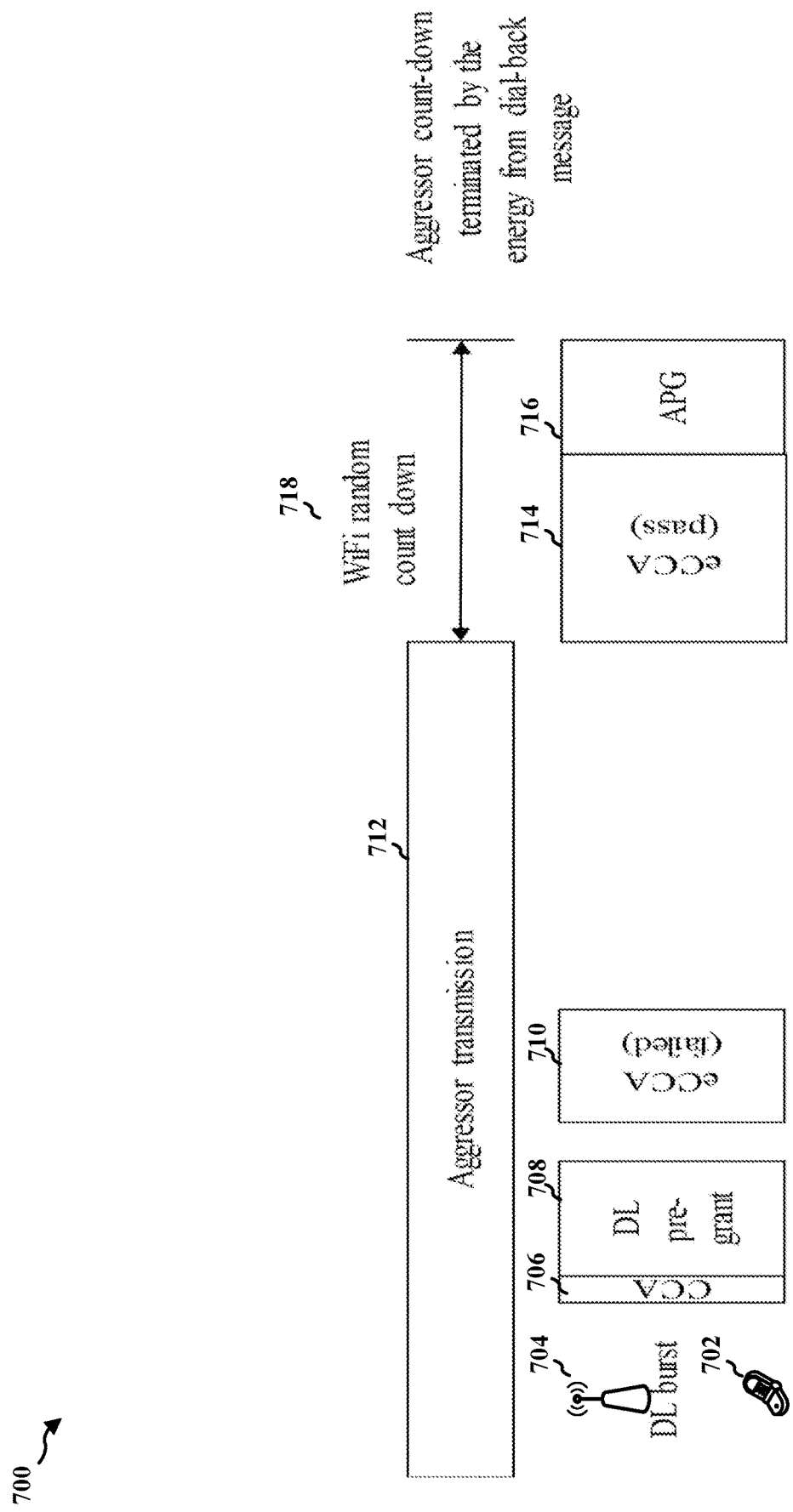
FIG. 7 is a diagram illustrating another example of a UE performing multiple clear channel assessments prior to receiving a downlink transmission from a base station.

FIG. 7 illustrates an example diagram 700 where a UE 702 transmits an APG to a base station 704 in the contention window of a Wi-Fi node. As described above with respect to FIG. 6, the base station 704 performs CCA 706, and if the CCA is successful, the base station sends a PG 708 to the UE. The PG 708 may indicate the sequence of timing offsets to be applied for APG transmission. The UE then performs eCCA 710 based on the sequence (e.g. at slots N, N+8, etc.). In this example, the initial eCCA 710 fails due to the presence of an interfering transmission 712 from the aggressor Wi-Fi node, but the next eCCA 714 succeeds since the interfering transmission 712 has completed. Therefore, the UE transmits one or more APGs 716 to the base station as described above. However, in this example, since an APG is transmitted during the contention window 718 of the Wi-Fi node, the Wi-Fi node applies a backoff (e.g. terminates the random count down in the contention window) due to detection of energy on the channel from the APG transmission. As a result, a level of cross-radio access technology (RAT) fairness can be achieved.

Figure 8:
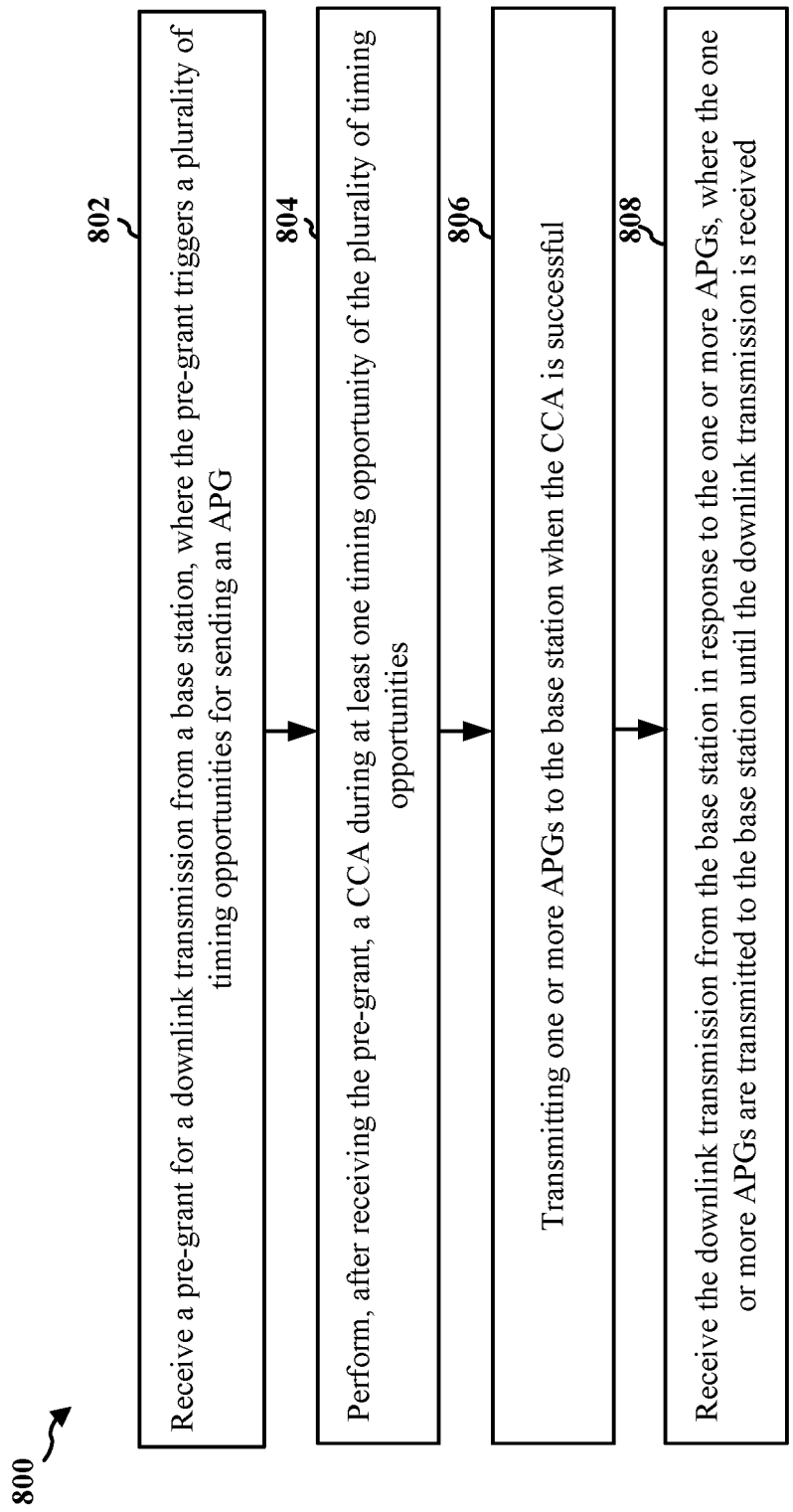
FIG. 8 is a flowchart of a method of wireless communication of a UE.

FIG. 8 is a flowchart 800 of a method of wireless communication. The method may be performed by a UE (e.g., the UE 104, 350, 402, 502, 602, 702, which may include the memory 360 and which may be the entire UE 350 or a component of the UE 350, such as the TX processor 368, the RX processor 356, and/or the controller/processor 359). The method provides multiple timing opportunities for a UE to transmit one or more APGs in response to a PG.

At 802, the UE receives a pre-grant for a downlink transmission from a base station, the pre-grant triggering a plurality of timing opportunities for sending an acknowledgment of the pre-grant (APG). The pre-grant may indicate a sequence of timing offsets corresponding to the plurality of timing opportunities. In one example, the pre-grant may indicate the sequence of timing offsets from a plurality of timing offset patterns. In another example, the pre-grant may indicate the sequence of timing offsets based on a bitmap corresponding to a timing offset pattern, and the sequence of timing offsets may be a subset of the timing offset pattern.

At 804, the UE performs, after receiving the pre-grant, a clear channel assessment (CCA) during at least one timing opportunity of the plurality of timing opportunities. The CCA may comprise an extended CCA (eCCA). The CCA may be successful based on an absence of an interfering transmission from another base station.

At 806, the UE transmits one or more APGs to the base station when the CCA is successful. The one or more APGs may be transmitted in selected frequency domain resources by the UE during the at least one timing opportunity. The pre-grant may indicate a physical uplink control channel (PUCCH) resource indicator (PRI) for the transmitting of the one or more APGs during each timing opportunity of the plurality of timing opportunities. The one or more APGs may be transmitted during a contention window of an interfering Wi-Fi node.

Finally, at 808, the UE receives the downlink transmission from the base station in response to the one or more APGs, where the one or more APGs are transmitted to the base station until the downlink transmission is received. The one or more APGs may be limited to a maximum number of APGs for each timing opportunity of the plurality of timing opportunities.

Figure 9:
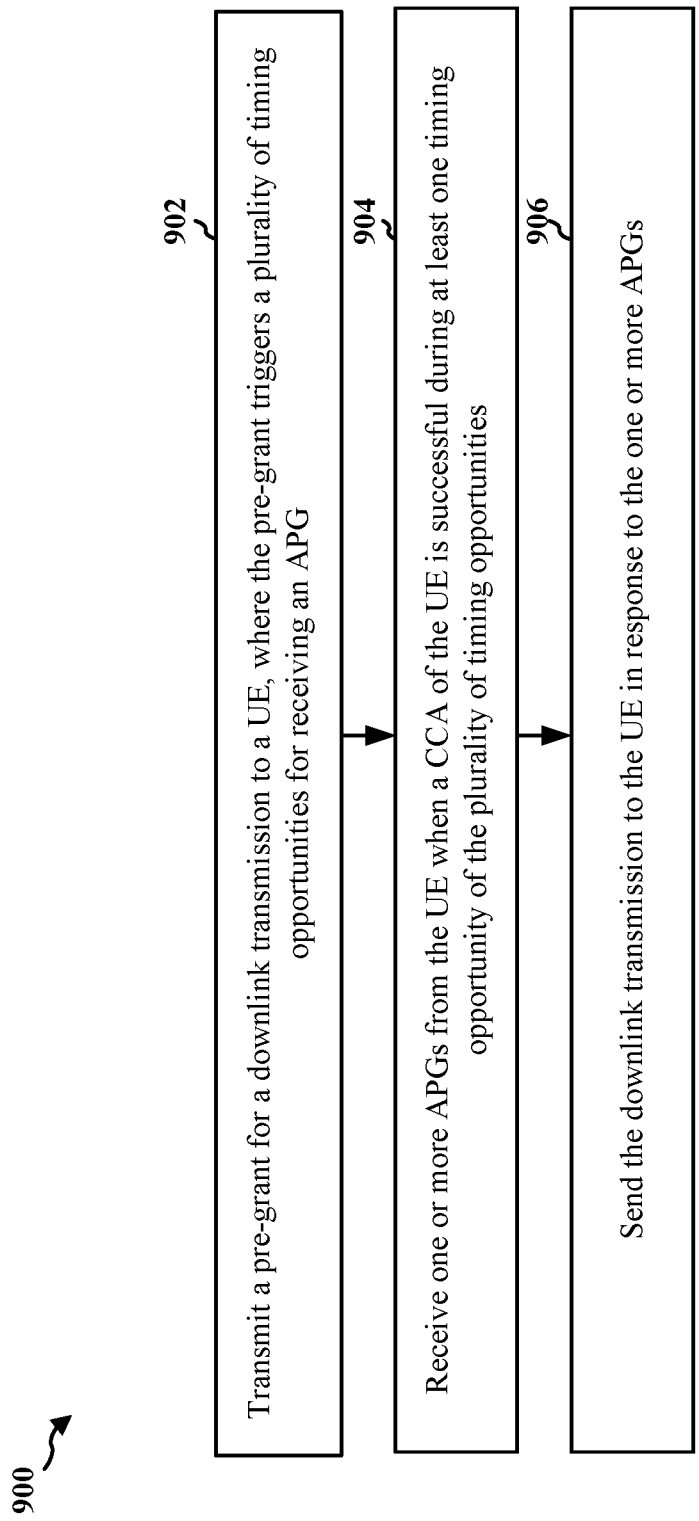
FIG. 9 is a flowchart of a method of wireless communication of a base station.

FIG. 9 is a flowchart 900 of a method of wireless communication. The method may be performed by a base station 310 (e.g., the base station 102, 310, 404, 504, 604, 704, which may include the memory 376 and which may be the entire base station 310 or a component of the base station 310, such as the TX processor 316, the RX processor 370, and/or the controller/processor 375). The method provides multiple timing opportunities for a base station to receive one or more APGs in response to a PG.

At 902, the base station transmits a pre-grant for a downlink transmission to a user equipment (UE), the pre-grant triggering a plurality of timing opportunities for receiving an acknowledgment of the pre-grant (APG). The pre-grant may indicate a sequence of timing offsets corresponding to the plurality of timing opportunities. In one example, the pre-grant may indicate the sequence of timing offsets from a plurality of timing offset patterns. In another example, the pre-grant may indicate the sequence of timing offsets based on a bitmap corresponding to a timing offset pattern, and the sequence of timing offsets may be a subset of the timing offset pattern. The pre-grant may indicate a physical uplink control channel (PUCCH) resource indicator (PRI) for the receiving of the one or more APGs during each timing opportunity of the plurality of timing opportunities.

At 904, the base station receives one or more APGs from the UE when a clear channel assessment (CCA) of the UE is successful during at least one timing opportunity of the plurality of timing opportunities. The CCA may comprise an extended CCA (eCCA). The one or more APGs may be received in selected frequency domain resources during the at least one timing opportunity. The CCA may be successful based on an absence of an interfering transmission from another base station. The one or more APGs may be limited to a maximum number of APGs for each timing opportunity of the plurality of timing opportunities. The one or more APGs may be received during a contention window of an interfering Wi-Fi node.

Finally, at 906, the base station sends the downlink transmission to the UE in response to the one or more APGs.

Figure 10:
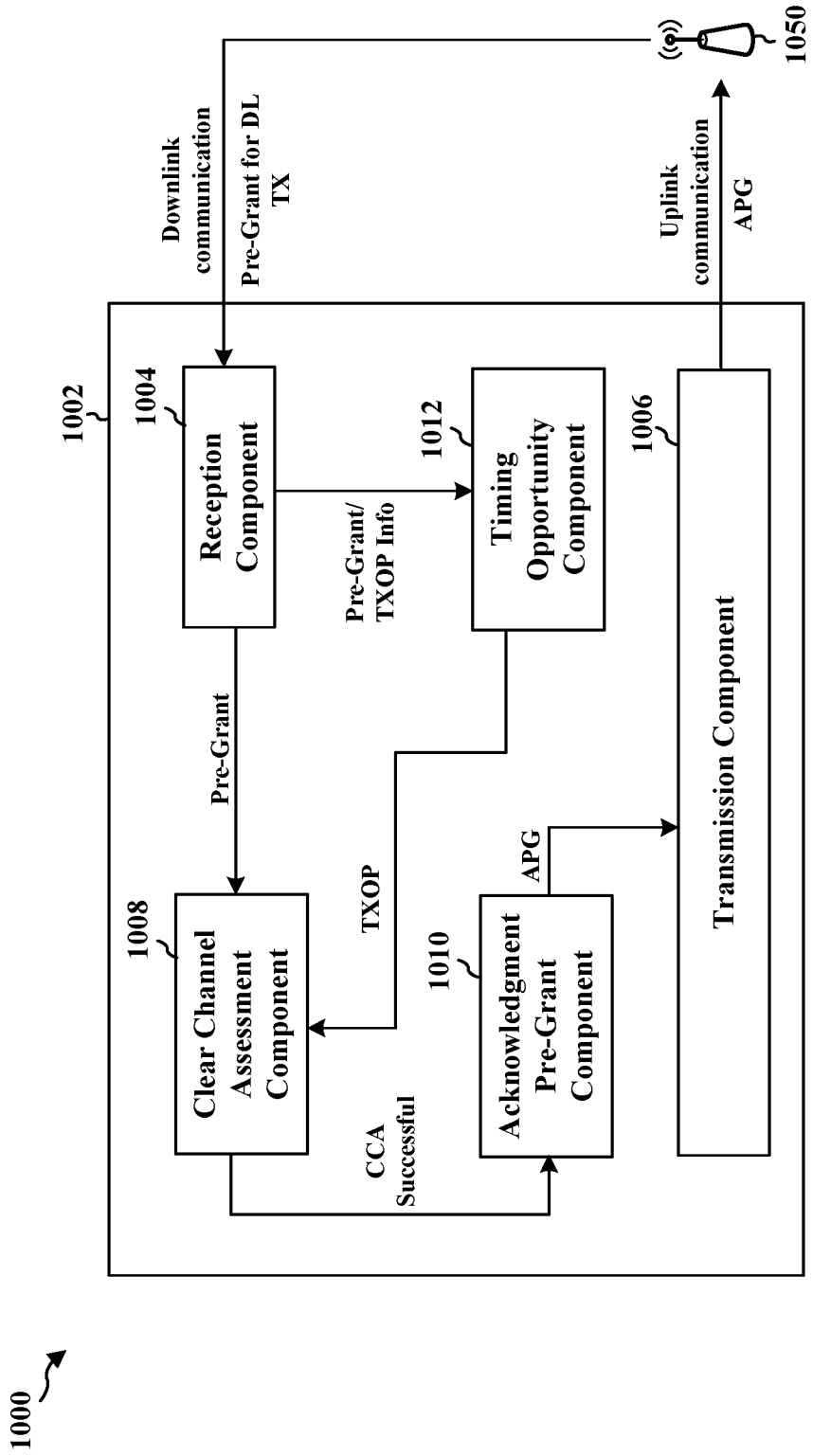
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 402, 502, 602, 702) in wireless communication with base station 1050.

The apparatus includes a reception component 1004 that receives downlink communication from the base station 1050. The reception component 1004 may be configured to receive signals and/or other information from other devices including, e.g., base station 1050. The signals/information received by the reception component 1004 may be provided to one or more components of the apparatus 1002 for further processing and use in performing various operations in accordance with the methods discussed supra including the processes of the aforementioned flowcharts 800 and 1000. Thus, via the reception component 1004, the apparatus 1002 and/or one or more components therein receive signals and/or other information (e.g., such as downlink data for the apparatus 1002 and/or other control signaling) from the base station 1050 as discussed supra and also discussed more specifically infra.

In some aspects, the reception component 1004 is configured to receive, from the BS, a pre-grant for a downlink transmission from a base station. In some aspects, the pre-grant triggers a plurality of timing opportunities for sending an acknowledgment of the pre-grant (APG), e.g., as described in connection with block 802 of FIG. 8. In some aspects, the reception component 1004 is also configured to receive the downlink transmission from the base station in response to the one or more APGs, e.g., as described in connection with block 808 of FIG. 8.

The apparatus includes a clear channel assessment component 1008 configured to perform, after receiving the pre-grant, a CCA during at least one timing opportunity of the plurality of timing opportunities, e.g., as described in connection with block 804 of FIG. 8. In some aspects, the CCA includes an extended CCA. In some aspects, the CCA is successful based on an absence of an interfering transmission from another base station.

The apparatus includes an acknowledgment pre-grant component 1010 configured to transmit one or more APGs to the base station when the CCA is successful, e.g., as described in connection with block 806 of FIG. 8. In some aspects, the one or more APGs are transmitted to the base station until the downlink transmission is received. In some aspects, the pre-grant indicates the sequence of timing offsets from a plurality of timing offset patterns. In some aspects, the pre-grant indicates the sequence of timing offsets based on a bitmap corresponding to a timing offset pattern, and the sequence of timing offsets is a subset of the timing offset pattern. In some aspects, the one or more APGs are transmitted during a contention window of an interfering Wi-Fi node.

The apparatus includes a transmission opportunity component 1012 configured to transmit, in coordination with the acknowledgment pre-grant component 1010, the one or more APGs in selected frequency domain resources during the at least one timing opportunity. In some aspects, the pre-grant indicates a sequence of timing offsets corresponding to the plurality of timing opportunities. In other aspects, the pre-grant indicates a PUCCH resource indicator (PRI) for the transmitting of the one or more APGs during each timing opportunity of the plurality of timing opportunities. In some aspects, the one or more APGs are limited to a maximum number of APGs for each timing opportunity of the plurality of timing opportunities.

The apparatus includes a transmission component 1006 that transmits uplink communication to the base station 1050. The transmission component 1006 may be configured to transmit various messages to one or more external devices, e.g., including the base station 1050, in accordance with the methods disclosed herein. The messages/signals to be transmitted may be generated by one or more other components as discussed above, or the messages/signals to be transmitted may be generated by the transmission component 1006 under the direction/control of the one or more other components discussed supra. Thus, in various configurations, via the transmission component 1006, the apparatus 1002 and/or one or more components therein transmit signals and/or other information (e.g., such as uplink data, control messages and/or other signals) to external devices such as the base station 1050.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
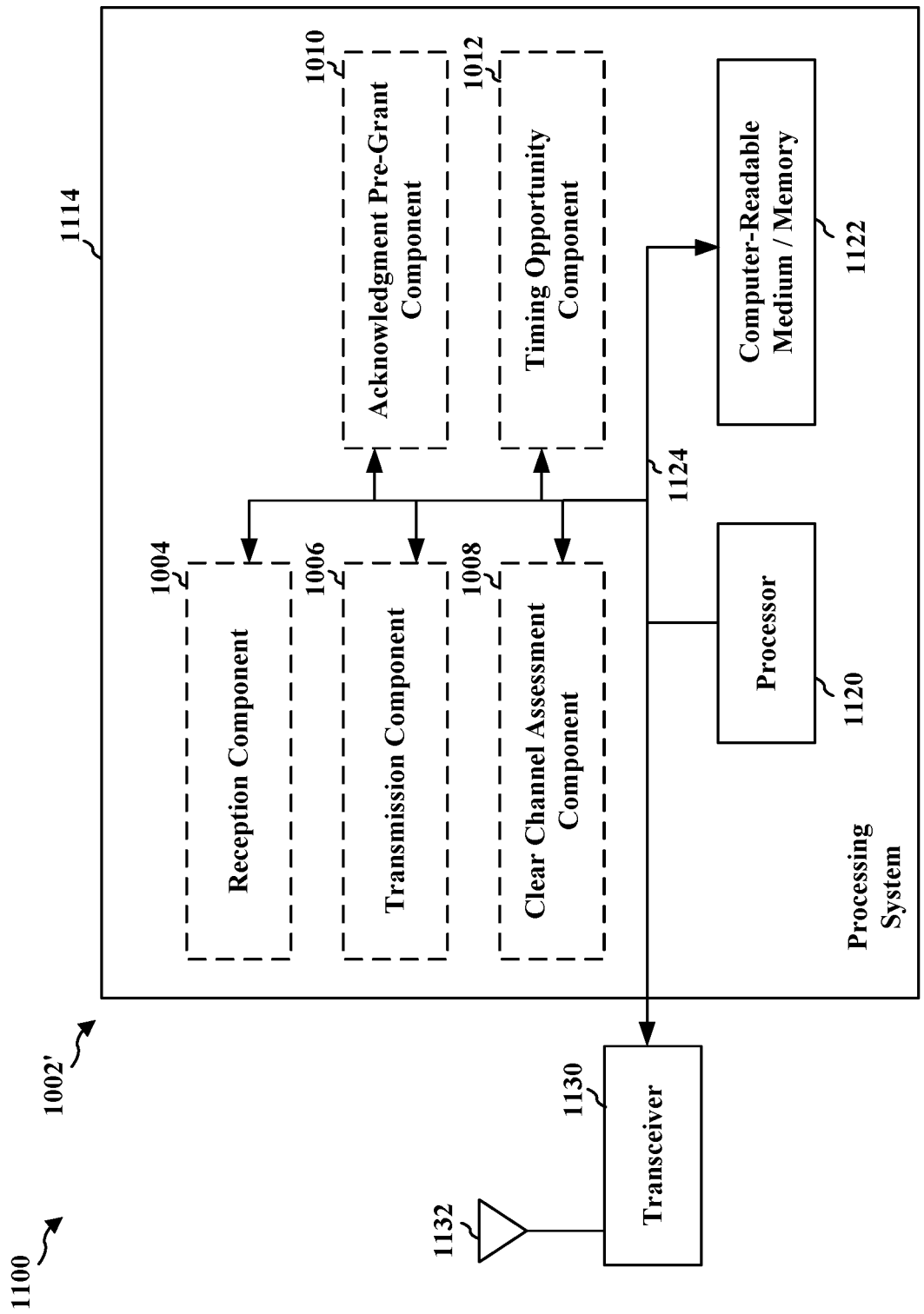
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1120, the components 1004, 1006, 1008, 1010, 1012 and the computer-readable medium/memory 1122. The bus 1124 may also link various other circuits such as timing sources, peripherals, voltage regulators, and power management circuits, which are well known in the art, and therefore, will not be described any further.

The processing system 1114 may be coupled to a transceiver 1130. The transceiver 1130 is coupled to one or more antennas 1132. The transceiver 1130 provides a means for communicating with various other apparatus over a transmission medium. The transceiver 1130 receives a signal from the one or more antennas 1132, extracts information from the received signal, and provides the extracted information to the processing system 1114, specifically the reception component 1004. In addition, the transceiver 1130 receives information from the processing system 1114, specifically the transmission component 1006, and based on the received information, generates a signal to be applied to the one or more antennas 1132. The processing system 1114 includes a processor 1120 coupled to a computer-readable medium/memory 1122. The processor 1120 is responsible for general processing, including the execution of software stored on the computer-readable medium/memory 1122. The software, when executed by the processor 1120, causes the processing system 1114 to perform the various functions described supra for any particular apparatus. The computer-readable medium/memory 1122 may also be used for storing data that is manipulated by the processor 1120 when executing software. The processing system 1114 further includes at least one of the components 1004, 1006, 1008, 1010, 1012. The components may be software components running in the processor 1120, resident/stored in the computer readable medium/memory 1122, one or more hardware components coupled to the processor 1120, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a pre-grant for a downlink transmission from a base station. In some aspects, the pre-grant triggers a plurality of timing opportunities for sending an acknowledgment of the pre-grant (APG). The apparatus 1002/1002' also includes means for performing, after receiving the pre-grant, a clear channel assessment (CCA) during at least one timing opportunity of the plurality of timing opportunities. The apparatus 1002/1002' also includes means for transmitting one or more APGs to the base station when the CCA is successful. The apparatus 1002/1002' also includes means for receiving the downlink transmission from the base station in response to the one or more APGs. In some aspects, the one or more APGs are transmitted to the base station until the downlink transmission is received.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
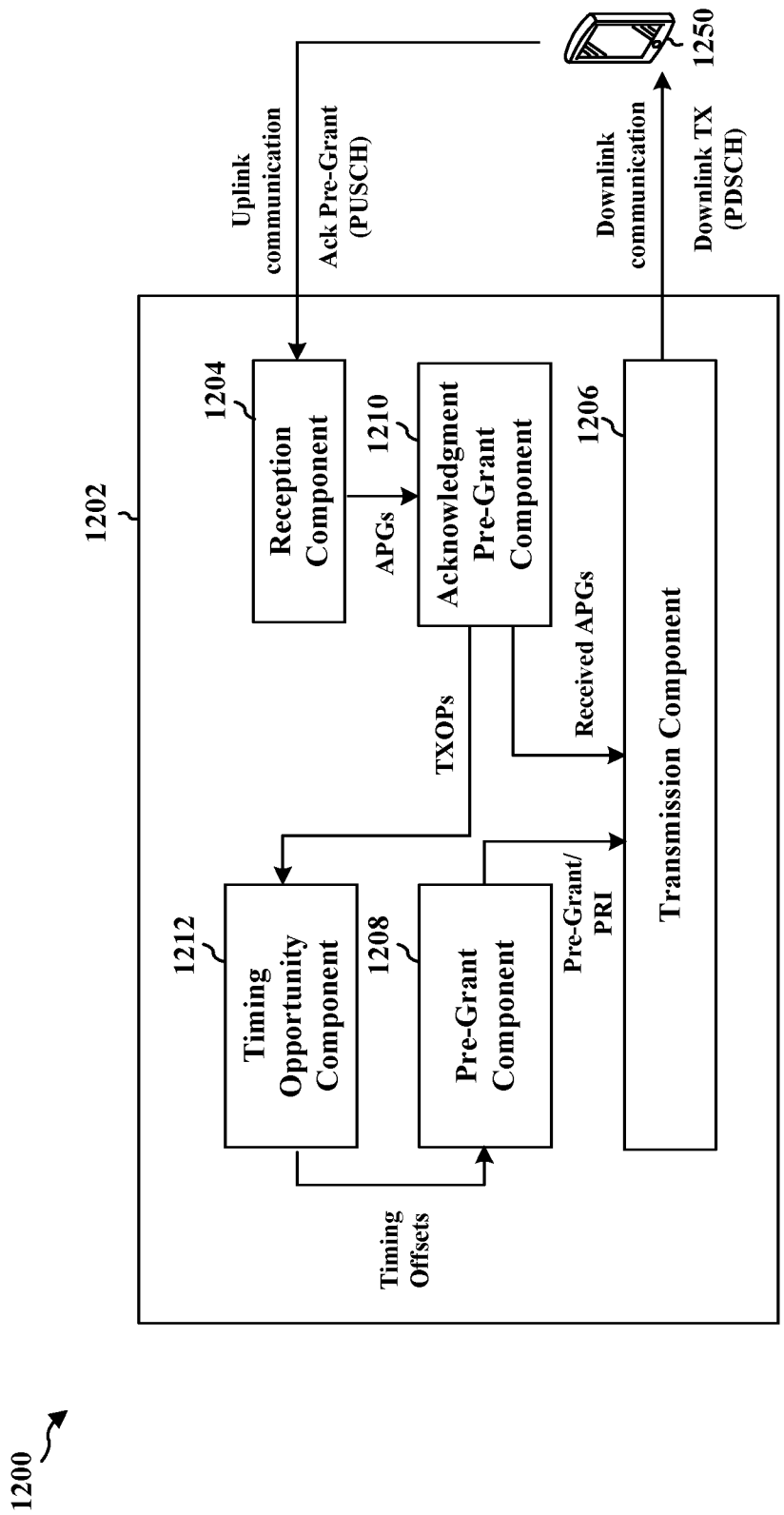
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., BS 102, 180, 310, 404, 504, 604, 704) in wireless communication with UE 1250.

The apparatus 1202 includes a pre-grant component 1208 configured to transmit a pre-grant for a downlink transmission to a UE, e.g., as described in connection with block 902 of FIG. 9. In some aspects, the pre-grant triggers a plurality of timing opportunities for receiving an acknowledgment of the pre-grant (APG). In some aspects, the pre-grant indicates a sequence of timing offsets corresponding to the plurality of timing opportunities. In some aspects, the pre-grant indicates the sequence of timing offsets from a plurality of timing offset patterns. In other aspects, the pre-grant indicates the sequence of timing offsets based on a bitmap corresponding to a timing offset pattern, and the sequence of timing offsets is a subset of the timing offset pattern. In some aspects, the pre-grant indicates a physical uplink control channel (PUCCH) resource indicator (PRI) for the receiving of the one or more APGs during each timing opportunity of the plurality of timing opportunities.

The apparatus 1202 includes an acknowledgment pre-grant component 1210 configured to receive one or more APGs from the UE when a CCA of the UE is successful during at least one timing opportunity of the plurality of timing opportunities, e.g., as described in connection with block 904 of FIG. 9. In some aspects, the one or more APGs are received in selected frequency domain resources during the at least one timing opportunity. In some aspects, the CCA includes an extended CCA (eCCA). In some aspects, the CCA is successful based on an absence of an interfering transmission from another base station. In some aspects, the one or more APGs are limited to a maximum number of APGs for each timing opportunity of the plurality of timing opportunities. In some aspects, the one or more APGs are received during a contention window of an interfering Wi-Fi node.

The apparatus 1202 includes a timing opportunity component 1212 configured to determine a plurality of timing opportunities from the received one or more APGs. In some aspects, the plurality of timing opportunities correspond to the sequence of timing offsets.

The apparatus 1202 includes a transmission component 1206 that transmits uplink communication to the UE 1250. The transmission component 1206 may be configured to transmit various messages to one or more external devices, e.g., including the UE 1250, in accordance with the methods disclosed herein. The messages/signals to be transmitted may be generated by one or more other components as discussed above, or the messages/signals to be transmitted may be generated by the transmission component 1206 under the direction/control of the one or more other components discussed supra. Thus, in various configurations, via the transmission component 1206, the apparatus 1202 and/or one or more components therein transmit signals and/or other information (e.g., such as downlink data, control messages and/or other signals) to external devices such as the UE 1250. In some aspects, the transmission component 1206 is configured to send the downlink transmission to the UE in response to the one or more APGs, e.g., as described in connection with block 906 of FIG. 9.

The apparatus 1202 includes a reception component 1204 that receives uplink communication from the UE 1250. The reception component 1204 may be configured to receive signals and/or other information from other devices including, e.g., UE 1250. The signals/information received by the reception component 1204 may be provided to one or more components of the apparatus 1202 for further processing and use in performing various operations in accordance with the methods discussed supra including the processes of the aforementioned flowcharts 1100 and 1200. Thus, via the reception component 1204, the apparatus 1202 and/or one or more components therein receive signals and/or other information (e.g., such as uplink data for the apparatus 1202 and/or other control signaling) from the UE 1250 as discussed supra and also discussed more specifically infra. In some aspects, the reception component 1204 is configured to receive the uplink transmission from the UE in response to the uplink grant, e.g., as described in connection with block 904 of FIG. 9.

The apparatus 1202 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
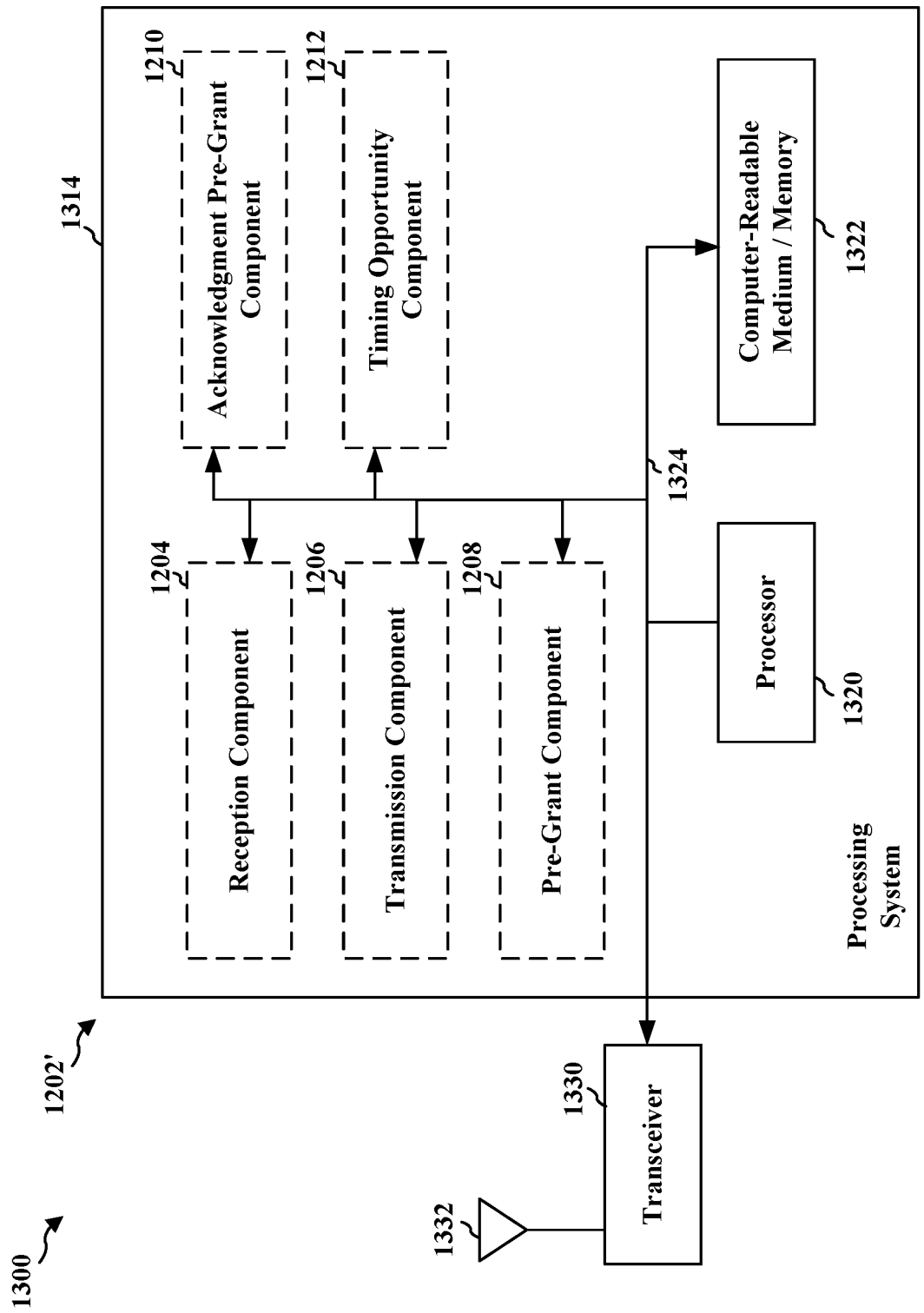
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1320, the components 1204, 1206, 1208, 1210, 1212 and the computer-readable medium/memory 1322. The bus 1324 may also link various other circuits such as timing sources, peripherals, voltage regulators, and power management circuits, which are well known in the art, and therefore, will not be described any further.

The processing system 1314 may be coupled to a transceiver 1330. The transceiver 1330 is coupled to one or more antennas 1332. The transceiver 1330 provides a means for communicating with various other apparatus over a transmission medium. The transceiver 1330 receives a signal from the one or more antennas 1332, extracts information from the received signal, and provides the extracted information to the processing system 1314, specifically the reception component 1204. In addition, the transceiver 1330 receives information from the processing system 1314, specifically the transmission component 1206, and based on the received information, generates a signal to be applied to the one or more antennas 1332. The processing system 1314 includes a processor 1320 coupled to a computer-readable medium/memory 1322. The processor 1320 is responsible for general processing, including the execution of software stored on the computer-readable medium/memory 1322. The software, when executed by the processor 1320, causes the processing system 1314 to perform the various functions described supra for any particular apparatus. The computer-readable medium/memory 1322 may also be used for storing data that is manipulated by the processor 1320 when executing software. The processing system 1314 further includes at least one of the components 1204, 1206, 1208, 1210, 1212. The components may be software components running in the processor 1320, resident/stored in the computer readable medium/memory 1322, one or more hardware components coupled to the processor 1320, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for transmitting a pre-grant for a downlink transmission to a user equipment (UE). In some aspects, the pre-grant triggers a plurality of timing opportunities for receiving an acknowledgment of the pre-grant (APG). The apparatus 1002/1002' also includes means for receiving one or more APGs from the UE when a clear channel assessment (CCA) of the UE is successful during at least one timing opportunity of the plurality of timing opportunities. The apparatus 1002/1002' also includes means for sending the downlink transmission to the UE in response to the one or more APGs.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and may be combined with aspects of other implementations or teachings described herein, without limitation.

Aspect 1 is a method of wireless communication at a user equipment that includes receiving a pre-grant for a downlink transmission from a base station, the pre-grant triggering a plurality of timing opportunities for sending an acknowledgment of the pre-grant (APG); performing, after receiving the pre-grant, a clear channel assessment (CCA) during at least one timing opportunity of the plurality of timing opportunities; transmitting one or more APGs to the base station when the CCA is successful; and receiving the downlink transmission from the base station in response to the one or more APGs, wherein the one or more APGs are transmitted to the base station until the downlink transmission is received.

In Aspect 2, the method of Aspect 1 further includes that the CCA includes an extended CCA (eCCA).

In Aspect 3, the method of Aspect 1 or Aspect 2 further includes that the pre-grant indicates a sequence of timing offsets corresponding to the plurality of timing opportunities.

In Aspect 4, the method of any of Aspects 1-3 further includes that the pre-grant indicates the sequence of timing offsets from a plurality of timing offset patterns.

In Aspect 5, the method of any of Aspects 1-4 further includes that the pre-grant indicates the sequence of timing offsets based on a bitmap corresponding to a timing offset pattern, and the sequence of timing offsets is a subset of the timing offset pattern.

In Aspect 6, the method of any of Aspects 1-5 further includes that the transmitting comprises transmitting the one or more APGs in selected frequency domain resources during the at least one timing opportunity.

In Aspect 7, the method of any of Aspects 1-6 further includes that the CCA is successful based on an absence of an interfering transmission from another base station.

In Aspect 8, the method of any of Aspects 1-7 further includes that the one or more APGs are limited to a maximum number of APGs for each timing opportunity of the plurality of timing opportunities.

In Aspect 9, the method of any of Aspects 1-8 further includes that the pre-grant indicates a PUCCH resource indicator (PRI) for the transmitting of the one or more APGs during each timing opportunity of the plurality of timing opportunities.

In Aspect 10, the method of any of Aspects 1-9 further includes that the one or more APGs are transmitted during a contention window of an interfering Wi-Fi node.

Aspect 11 is a device including one or more processors and one or more memories in electronic communication with the one or more processors storing instructions executable by the one or more processors to cause the system or apparatus to implement a method as in any of Aspects 1 to 10.

Aspect 12 is a system or apparatus including means for implementing a method or realizing an apparatus as in any of Aspects 1 to 10.

Aspect 13 is a non-transitory computer readable medium storing instructions executable by one or more processors to cause the one or more processors to implement a method as in any of Aspects 1 to 10.

Aspect 14 is a method of wireless communication at a base station that includes transmitting a pre-grant for a downlink transmission to a user equipment (UE), the pre-grant triggering a plurality of timing opportunities for receiving an acknowledgment of the pre-grant (APG); receiving one or more APGs from the UE when a clear channel assessment (CCA) of the UE is successful during at least one timing opportunity of the plurality of timing opportunities; and sending the downlink transmission to the UE in response to the one or more APGs.

In Aspect 15, the method of Aspect 14 further includes that the CCA includes an extended CCA (eCCA).

In Aspect 16, the method of Aspect 14 or Aspect 15 further includes that the pre-grant indicates a sequence of timing offsets corresponding to the plurality of timing opportunities.

In Aspect 17, the method of any of Aspects 14-16 further includes that the pre-grant indicates the sequence of timing offsets from a plurality of timing offset patterns.

In Aspect 18, the method of any of Aspects 14-17 further includes that the pre-grant indicates the sequence of timing offsets based on a bitmap corresponding to a timing offset pattern, and the sequence of timing offsets is a subset of the timing offset pattern.

In Aspect 19, the method of any of Aspects 14-18 further includes that the one or more APGs are received in selected frequency domain resources during the at least one timing opportunity.

In Aspect 20, the method of any of Aspects 14-19 further includes that the CCA is successful based on an absence of an interfering transmission from another base station.

In Aspect 21, the method of any of Aspects 14-20 further includes that the one or more APGs are limited to a maximum number of APGs for each timing opportunity of the plurality of timing opportunities.

In Aspect 22, the method of any of Aspects 14-21 further includes that the pre-grant indicates a physical uplink control channel (PUCCH) resource indicator (PRI) for the receiving of the one or more APGs during each timing opportunity of the plurality of timing opportunities.

In Aspect 23, the method of any of Aspects 14-22 further includes that the one or more APGs are received during a contention window of an interfering Wi-Fi node.

Aspect 24 is a device including one or more processors and one or more memories in electronic communication with the one or more processors storing instructions executable by the one or more processors to cause the system or apparatus to implement a method as in any of Aspects 1 to 23.

Aspect 25 is a system or apparatus including means for implementing a method or realizing an apparatus as in any of Aspects 1 to 23.

Aspect 26 is a non-transitory computer readable medium storing instructions executable by one or more processors to cause the one or more processors to implement a method as in any of Aspects 1 to 23.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment, the method comprising:
   receiving, from a base station, a pre-grant for a downlink transmission, the pre-grant triggering a plurality of timing opportunities for sending an acknowledgment of the pre-grant (APG);
   performing, after receiving the pre-grant, a clear channel assessment (CCA) during at least one timing opportunity of the plurality of timing opportunities;
   transmitting, to the base station, an initial APG and one or more retransmissions of the initial APG during the at least one timing opportunity when the CCA is successful; and
   receiving the downlink transmission from the base station in response to the initial APG and the one or more retransmissions of the initial APG.

2. The method of claim 1, wherein the CCA comprises an extended CCA (eCCA).

3. The method of claim 1, wherein the pre-grant indicates a sequence of timing offsets corresponding to the plurality of timing opportunities.

4. The method of claim 3, wherein the pre-grant indicates the sequence of timing offsets from a plurality of timing offset patterns.

5. The method of claim 3, wherein:
   the pre-grant indicates the sequence of timing offsets based on a bitmap corresponding to a timing offset pattern, and
   the sequence of timing offsets is a subset of the timing offset pattern.

6. The method of claim 1, wherein the transmitting comprises transmitting the initial APG and the one or more retransmissions of the initial APG in selected frequency domain resources during the at least one timing opportunity.

7. The method of claim 1, wherein performing the CCA comprises determining that the CCA is successful based on an absence of an interfering transmission from another base station.

8. The method of claim 1, wherein the initial APG and the one or more retransmissions of the initial APG are transmitted to the base station until the downlink transmission is received, wherein the one or more retransmissions of the initial APG are limited to a maximum number of APGs for each timing opportunity of the plurality of timing opportunities.

9. The method of claim 1, wherein the pre-grant indicates a physical uplink control channel (PUCCH) resource indicator (PRI) for the transmitting of the initial APG and the one or more retransmissions of the initial APG during each timing opportunity of the plurality of timing opportunities.

10. The method of claim 1, wherein the transmitting comprises transmitting the initial APG and the one or more retransmissions of the initial APG during a contention window of an interfering Wi-Fi node.

11. An apparatus for wireless communication at a user equipment, the apparatus comprising:
    at least one processor; and
    a memory, coupled to the at least one processor, storing computer-executable code that when executed by the at least one processor, causes the apparatus to:
      receive, from a base station, a pre-grant for a downlink transmission, the pre-grant triggering a plurality of timing opportunities for sending an acknowledgment of the pre-grant (APG);
      perform, after receiving the pre-grant, a clear channel assessment (CCA) during at least one timing opportunity of the plurality of timing opportunities;
      transmit, to the base station, an initial APG and one or more retransmissions of the initial APG during the at least one timing opportunity when the CCA is successful; and
      receive the downlink transmission from the base station in response to the initial APG and the one or more retransmissions of the initial APG.

12. The apparatus of claim 11, wherein the code further causes the apparatus to transmit the initial APG and the one or more retransmissions of the initial APG in selected frequency domain resources during the at least one timing opportunity.

13. The apparatus of claim 11, wherein the code further causes the apparatus to determine that the CCA is successful based on an absence of an interfering transmission from another base station.

14. The apparatus of claim 11, wherein the code further causes the apparatus to transmit the initial APG and the one or more retransmissions of the initial APG during a contention window of an interfering Wi-Fi node.

15. The apparatus of claim 11, wherein the pre-grant indicates a sequence of timing offsets corresponding to the plurality of timing opportunities.

16. The apparatus of claim 11, wherein the pre-grant indicates a physical uplink control channel (PUCCH) resource indicator (PRI) for the transmitting of the initial APG and the one or more retransmissions of the initial APG during each timing opportunity of the plurality of timing opportunities.

17. A method of wireless communication at a base station comprising:
    transmitting, to a user equipment (UE), a pre-grant for a downlink transmission, the pre-grant triggering a plurality of timing opportunities for receiving an acknowledgment of the pre-grant (APG);
    receiving, from the UE, an initial APG and one or more retransmissions of the initial APG when a clear channel assessment (CCA) of the UE is successful during at least one timing opportunity of the plurality of timing opportunities; and communicating, with the UE, the downlink transmission in response to the receiving the initial APG and the one or more retransmissions of the initial APG.

18. The method of claim 17, wherein the CCA comprises an extended CCA (eCCA).

19. The method of claim 17, wherein the pre-grant indicates a sequence of timing offsets corresponding to the plurality of timing opportunities.

20. The method of claim 19, wherein the pre-grant indicates the sequence of timing offsets from a plurality of timing offset patterns.

21. The method of claim 19, wherein:
the pre-grant indicates the sequence of timing offsets based on a bitmap corresponding to a timing offset pattern, and
the sequence of timing offsets is a subset of the timing offset pattern.

22. The method of claim 17, wherein the receiving comprises receiving the initial APG and the one or more retransmissions of the initial APG in selected frequency domain resources during the at least one timing opportunity.

23. The method of claim 17, wherein the CCA is successful based on an absence of an interfering transmission from another base station.

24. The method of claim 17, wherein the one or more retransmissions of the initial APG are limited to a maximum number of APGs for each timing opportunity of the plurality of timing opportunities.

25. The method of claim 17, wherein the pre-grant indicates a physical uplink control channel (PUCCH) resource indicator (PRI) for the receiving of the initial APG and the one or more retransmissions of the initial APG during each timing opportunity of the plurality of timing opportunities.

26. The method of claim 17, wherein the receiving comprises receiving the initial APG and the one or more retransmissions of the initial APG during a contention window of an interfering Wi-Fi node.

27. An apparatus for wireless communication at a base station, the apparatus comprising:
at least one processor; and
a memory, coupled to the at least one processor, storing computer-executable code that when executed by the at least one processor, causes the apparatus to:
transmit, to a user equipment (UE), a pre-grant for a downlink transmission, the pre-grant triggering a plurality of timing opportunities for receiving an acknowledgment of the pre-grant (APG);
receive, from the UE, an initial APG and one or more retransmissions of the initial APG when a clear channel assessment (CCA) of the UE is successful during at least one timing opportunity of the plurality of timing opportunities; and
communicate, with the UE, the downlink transmission in response to the receiving the initial APG and the one or more retransmissions of the initial APG.

28. The apparatus of claim 27, wherein the code further causes the apparatus to receive the initial APG and the one or more retransmissions of the initial APG in selected frequency domain resources during the at least one timing opportunity.

29. The apparatus of claim 27, wherein the one or more retransmissions of the initial APG are limited to a maximum number of APGs for each timing opportunity of the plurality of timing opportunities.

30. The apparatus of claim 27, wherein the pre-grant indicates a physical uplink control channel (PUCCH) resource indicator (PRI) for the receiving of the initial APG and the one or more retransmissions of the initial APG during each timing opportunity of the plurality of timing opportunities.

* * * * *